(12) United States Patent
Pagade

(10) Patent No.: US 6,585,237 B2
(45) Date of Patent: Jul. 1, 2003

(54) FLUID CONTACTING DEVICE USED AS STRUCTURED PACKING AND STATIC MIXER

(76) Inventor: Pradeep Khasherao Pagade, Type IV/27/244, RCF Township, Chembur, Mumbai, Maharashtra (IN), 400074

( * ) Notice: Subject to any disclaimer, the term of this patent is extended or adjusted under 35 U.S.C. 154(b) by 0 days.

(21) Appl. No.: 09/864,459

(22) Filed: May 25, 2001

(65) Prior Publication Data

US 2002/0063344 A1 May 30, 2002

(30) Foreign Application Priority Data

Oct. 16, 2000 (IN) .................................. 927/MUM/2000

(51) Int. Cl.$^7$ .................................................. B01F 3/04
(52) U.S. Cl. .................... 261/94; 261/84; 261/DIG. 72; 366/339; 422/224
(58) Field of Search ..................... 261/94–98, 112.1, 261/112.2, 79.2, 84, 91–93, DIG. 72; 366/388, 339; 422/224, 229; 210/150; 138/42

(56) References Cited

U.S. PATENT DOCUMENTS

| | | | | |
|---|---|---|---|---|
| 3,286,992 A | * | 11/1966 | Armeniades et al. .. | 261/79.2 X |
| 3,466,151 A | * | 9/1969 | Sicard et al. ........ | 261/DIG. 72 |
| 3,589,687 A | * | 6/1971 | Leybourne, III ..... | 261/DIG. 72 |
| 4,088,449 A | * | 5/1978 | Smith ...................... | 366/399 X |
| 4,202,635 A | * | 5/1980 | Hendrickson ........... | 366/338 X |
| 4,224,257 A | * | 9/1980 | Robinson ............. | 261/DIG. 72 |
| 4,296,050 A | | 10/1981 | Meier .................. | 261/DIG. 72 |
| 4,408,893 A | * | 10/1983 | Rice, III ..................... | 366/339 |
| 4,501,707 A | * | 2/1985 | Buhlmann ........... | 261/DIG. 72 |
| 4,538,920 A | * | 9/1985 | Drake ..................... | 366/339 X |
| 4,676,934 A | | 6/1987 | Seah ...................... | 422/224 X |
| 4,776,704 A | * | 10/1988 | Kopunek et al. ........ | 366/339 X |
| 4,850,705 A | * | 7/1989 | Horner ................... | 366/338 X |
| 5,063,000 A | | 11/1991 | Mix ............................ | 261/94 |
| 5,158,712 A | | 10/1992 | Welhelm ................... | 261/79.2 |
| 5,407,607 A | | 4/1995 | Mix ........................ | 261/112.2 |
| 5,441,793 A | | 8/1995 | Suess .................. | 261/112.2 X |
| 5,500,160 A | | 3/1996 | Suess ........................ | 261/79.2 |
| 5,700,403 A | | 12/1997 | Billingham et al. ..... | 261/112.2 |
| 5,876,638 A | | 3/1999 | Sunder et al. ........... | 261/112.2 |
| 5,901,575 A | | 5/1999 | Sunder .................... | 202/158 X |
| 5,975,503 A | | 11/1999 | Chuang et al. .......... | 261/112.1 |

FOREIGN PATENT DOCUMENTS

| | | | | |
|---|---|---|---|---|
| DE | 551071 | * | 5/1932 | .................. 261/94 |
| GB | 420281 | * | 11/1934 | .......... 261/DIG. 72 |
| WO | WO 90/10497 | | 9/1990 | |

OTHER PUBLICATIONS

Newsfront, "Boosting Tower Performance by More Than a Trickle", Chemical Engineering, May 1985, vol. 92, issue–11, pp. 22–27.

Harrison M, "Distillation Column Troubleshooting, Part–2", Chemical Engineering, Apr. 1989, vol. 96, Issue 4, pp. 121–128.

Killat G, "Improving Low Flow Distillations", Chemical Engineering, Oct., 1992, vol. 99, Issue 10, pp. 185–186.

Bravo J, "Column Internals: Maximise Efficieny in Distillation, Absorbtion, Stripping and Extraction", Chem. Engineering, Feb. 1998, vol. 105, Issue–2, pp. 76–83.

Newsfront, "Packing Towers: New structured Packings Reduce Flooding and Increase Capacity 20–30%", Chem–Engineering, Dec. 1999, vol. 106, Issue–13, pp. 39–43.

Newsfront, "Drip and Drop in Lohimn Internals", Chemical Engineering, Jul. 2000, vol. 107, Issue 7, pp. 27–31.

* cited by examiner

Primary Examiner—Richard L. Chiesa (57) ABSTRACT

A fluid contacting device including a bundle of notched and precontoured strips which are notched periodically at edges and shaped by giving proper orientation (twist) so that the liquid trickling down the strip flows and spreads on the contoured roughened surface simultaneously alternating back and forth on the two opposite sides of the strip and intermixing from one strip to adjoining ones through plurality of contact points achieved with haystack bundle like winding of alternately inclined strips around equipment axis to achieve intimate contact between trickling film and other phase traveling in the twisting channels.

10 Claims, 11 Drawing Sheets

FLUID CONTACTING DEVICE USED AS STRUCTURED PACKING AND STATIC MIXER

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to a contacting device used as packing in mass and heat exchange equipment like distillation column or used as a static mixer to blend fluids. Any commercial chemical process requires mass and heat transfer between fluids. These processing methods can include distillation, absorption, adsorption, desorption, stripping, drying, gas cleaning, humidification, dehumidification and direct contact cooling or heating.

The equipment, which carries out such operation, is required to provide a contacting medium or device for generating effective transfer rates. These contacting media or devices must be capable of providing sufficient interfacial area over which two fluids can interface with one another. Further the area should be configured in a relatively small volume. The higher density of effectively available area provided by a contacting device reduces the size of the equipment and consequently reduce manufacturing cost. In addition, the contacting device should be flexible in its configuration so as to be useful for multitudes of different fluids handled in chemical industry. These contacting devices are generally hollow or solid bodies of predetermined size, shape, configuration and orientation. The "structured" packing has individual members oriented in a predetermined fashion The "random" packing is dumped and has no specific orientation within the equipment.

An ideal contacting device should have three major strengths:

It should provide a wetting film of liquid covering all of provided area.

It should provide least resistance to flow of rising gas.

Each of the contacting phases should remain well mixed at any cross-section of packing providing uniform profile of flow, concentration and temperature.

To some extent, these are contradictory requirements. Provision of higher area for liquid film requires dense structure. This reduces voidage available for gas flow and increases gas pressure drop. Liquids have natural tendency to consolidate. Any aids like structural protrusions to split and spread liquids, become obstacles in the gas path increasing its pressure drop. Prior art describes numerous packing structures based on corrugated sheets layout. These are at best workable compromises—far from perfection. Traditionally known prior art contacting device like structured packing is built with layers of zigzag folded metal sheets (corrugated or pleated sheets) as described in WO 90/10497 and U.S. Pat. No. 4,926,050 (Meier). These sheets are arranged in layers parallel to the direction of the axis of flow but the folders are inclined to the axis. The layers are arranged alternately making multiple channels crossing each other.

The prior art corrugated sheet layout suffers from few deficiencies, which reduce and limit the performance in terms of contacting efficiency. The deficient performance is mostly due to inherent geometry of corrugated sheet layout. Liquids have a natural tendency (due to surface tension) to merge together into a consolidated stream. This "sheeting" of liquid film, leads to under-irrigated portions on the corrugated sheet thus wasting some of the available sheet area. The morphology (inherent spatial geometry of construction) of prior art packing does not particularly avoid this "sheeting" of liquid and consequent lowering of contact efficiency.

Another notable deficiency of corrugated sheets is, limited intermixing of cascading streams at any location. Even the liquid on one side of the corrugated sheet cannot mix with the liquid on the opposite side.

Many inventors have addressed these problems in the past. In one embodiment, the corrugated packing sheets have number of holes drilled for the liquid to cross-over (U.S. Pat. No. 5,876,638, Sunder). In another scheme, "w" and "v" shaped shutter openings are formed on the corrugated sheet to create liquid drip points and improve mixing.(U.S. Pat. No. 4,676,934, Seah). Yet another scheme suggests provision of oblique deflection surfaces that are projected from corrugations to mix liquid flowing on the opposite side of the same sheet (U.S. Pat. No. 5,063,000, Mix and U.S. Pat. No. 5,407,607, Mix).

However, all such holes, shutters or deflections reduce the available sheet area for the liquid film. Further the sudden discontinuity created by these features in the path of the liquid film distorts the already created film. Thus all these improvements become counter-productive by disturbing the very liquid film that one had aimed to stabilize. Further the projections suggested in these improvements add to pressure drop for the rising vapor or gas.

The liquid flowing in one set of channels of the corrugated sheets tends to flow down in the same location without much of a lateral movement. The low level of lateral mixing of the fluids (in the direction perpendicular to the equipment axis) also reduces contact efficiency due to non-uniform concentration gradient.

The low lateral movement of the liquid on the corrugated sheet layout tends to maintain uneven flow profile. The uniformity of liquid spread and in turn exchange efficiency of packing depends totally on initial distribution. This has to be provided by additional devices like liquid distributors located above the corrugated packing. This essentially limits the range of operation of packing, as the distributor normally looses performance much before the efficiency limit of packing is reached. Thus corrugated sheet packing becomes as good as the distributor above it.

The inclined channels at the ends of the bundle of the prior art packing tend to put the liquid towards walls of the equipment. The morphology of the arrangement of corrugated sheets does not provide a way to transport this wall liquid back into the bulk of packing. The severity of this problem was long recognized. One scheme by Billingham (U.S. Pat. No. 5,700,403) suggests provision of recessed vertical edges in the corrugation to divert wall liquid. In another scheme, the folded layers are coupled by redirector elements for the edge seeking liquid to reduce the migration of liquid towards the equipment wall.(U.S. Pat. No. 5,441, 793, Suess).

Both the schemes are complicated to fabricate and add few extra steps in manufacture thereby increasing the cost.

Apart from liquid distribution, the uniform distribution of rising vapor or gas and its lateral mixing is also a concern in the corrugated sheet layout. The vapor tends to flow in channels without mixing with the vapor in the adjacent channels in a corrugated sheet bundle.

This problem is addressed in one embodiment by providing fan like vane elements to aid transverse (lateral) mixing (U.S. Pat. No. 5,158,712, Wilhem). In another embodiment, the elementary triangular area in the folding has two cut edges that are deflected in a flap like manner to form vortex packing (U.S. Pat. No. 5,500,160, Suess). However these embodiments still retain legacy of corrugated or pleated sheets morphology. The embodiments suggest deflection of partly cut portions in the corrugated channels to form vanes. These embodiments still achieve limited split and mixing of vapor phase and are undue complex and hence costly. In another scheme, angled pegs are projected at various places from one sheet to adjoining sheet forming a bridge for lateral movement of both liquid and vapor (U.S. Pat. No. 5,975,503, Chuang). All these methods add to cost and complexity of the packing.

In order to spread the liquid and the vapor uniformly across the radial plane, the corrugated sheet bundles are required to be kept short. Further, the prior art bundles have to be stacked so that the channels are rotated by 90 degrees to each other. This feature essential for distribution of liquid is at the cost of additional pressure drop for the rising vapor. The vapor has to abruptly change its direction at each of the numerous junctions between the short bundles. This high turbulence of vapor at the junctions is one of the reasons of liquid carryover, back mixing of the liquid, foaming and is a probable place where column flooding starts.

The traditional packing is made so as to fit into a specific size or diameter of equipment. The corrugated sheets are cut and assembled to fill the entire cross section of the column. The individual sheets' width is fixed by the diameter of the equipment and the location of that particular sheet in the bundle. If the capacity or processing requirements change, the equipment diameter changes. The originally purchased packing cannot be used for a new diameter. This diameter specific nature of the prior art packing limits its use in any other equipment of different size and shape. This reduces flexibility or reusability of the prior art packing for varying requirements.

Most of the deficiencies enumerated above arise due to the inherent morphology of the corrugated sheet layout. The known improvements and variants of the corrugated packing are end-of-the-pipe solutions. They aim at solving problems by going around it than eliminating it.

Therefore, there is a need to develop a contacting device or structured packing that mitigates the drawbacks of the prior art packing. The new way aims to break off from the prior art corrugated sheets layout by providing for a structured packing comprising of a haystack like wound bundle made from discrete, contoured, and preshaped elements.

BRIEF SUMMARY OF INVENTION

The present invention is based on a totally different morphology compared to the known corrugated sheet packing morphology. The invention in its generalized form, provides a structured packing comprising of a haystack like wound bundle of discrete elements. The subdivided surface of the individual element is given a spatial orientation (contour) to achieve substantial wetting by the liquid. The contoured surfaces are positioned as to give an overall helical shape to the element. The oppositely inclined elements are arranged in two (or more) layers one above the other and then wound into a haystack like bundle. This uniform spatial arrangement distributes liquid evenly into many trickle streams flowing down the matrix of many inclined and interlinked elements. The gas rises through multidirectional twisting spaces created by voids in the matrix of the bundle. The preferred embodiment uses strips as the element for constructing the contiguous bundle. The present invention will be useful as a phase contacting media for distillation, absorption, stripping, liquid-liquid extraction, multiphase reactors (packed or trickle towers). It can be also used for in-pipe static mixing or for mixing fluids in a vessel. The morphology of this invention is so versatile, that it can be used as a liquid distributor or a mist eliminator.

Further objective of the present invention is to make more efficient packing that maximizes the liquid spread on the provided structured packing area. In the preferred embodiment, the strip surface is so contoured and roughened as to guide the small liquid stream trickling down along both sides of the strip, to spread and wet maximum of its surface area. The liquid flow splits as tiny streamlets on the multitudes of strips quickly attaining isotropic (uniform in all directions) flow. The liquid consolidation or "sheeting" observed in prior art corrugated sheet packing is thus effectively tackled in this invention.

According to another objective of the invention, the streams of rising gas smoothly and repeatedly split and recombine in the gently twisting spaces in the voids of the matrix of the inclined strip. The gas is divided into numerous directions. This flow path keeps the gas well mixed giving uniform concentration gradient. The present invention avoids sudden and abrupt change of direction of the gas, both within and between the stacked bundles. Further, absence of any protruding obstacles in the gas path helps in reducing pressure drop of the rising gas. This feature has a marked advantage over the prior art wherein the gas abruptly changes direction at the junctions of the bundles.

Another object of this invention is to allow lateral movement of the liquid to achieve uniformity in terms of composition at any cross section in the packed section. This objective is achieved due to an inherent geometry, in which the inclined strips in one layer are in contact with many strips in neighborhood layers. This morphology distributes the liquid quickly and uniformly across the entire cross section of the packing and to an extent self corrects any maldistribution. This unhindered lateral movement of the liquid and continuous self-correction of maldistribution is a distinct advantage. In contrast, the prior art packing is totally dependent on extra devices such as the liquid distributors.

Additional object of this invention is to reduce excessive migration of trickling liquid towards the walls of the equipment. The inherent morphology of this invention, helps to transfer the wall liquid back into the bulk packing. The adjacent strips in the bundle are touching each other in several directions and at multiple points. This helps in transferring the excess liquid from one strip to all adjacent strips quickly. This generates a net movement of the liquid from flooded area to under-irrigated area. The strips in the outer most layer in the bundle, which are touching the equipment wall or wall wipers collect the liquid. The lateral liquid migration from strip to strip then provides a quick way for the wall liquid to travel into the bulk packing. In the corrugated sheet, the foldings at the outer edges deliver liquid on the equipment wall. This liquid tends to travel along the wall bypassing the bulk packing. The prior art requires complex redirectors to redirect wall liquid.

Further, the packing morphology makes it possible to add or remove elements (layers of strips) to suit changes in the equipment diameter. The present invention has morphology that makes the packing reusable and flexible for such size variations. This is a distinct advantage over the prior art corrugated sheets that are essentially diameter-specific. Further object of this invention is to make contacting device versatile. In the present invention elements can be in variety of shapes like strips, rods, flattened tubes, and rectangular plates. By manipulating the geometric parameters, type of element and thus the morphology of the bundle, one can make various devices like structured packing, random packing, liquid distributor, mist eliminator, static mixer, and agitator. Such a multiple and versatile application range is not possible with the prior art devices.

Further objects and advantages of the present invention will become apparent from a consideration of the drawings and ensuing description.

BRIEF DESCRIPTION OF SEVERAL VIEWS OF DRAWING

The strips are shown away from each other and on a shaded background only for clarity of view.

Reference Alpha-Numerals in Drawings

| 1 | Link | 2 | Notches on strips |
|---|---|---|---|
| 3 | Base of Link | 4 | Strip |
| 5 | Horizontal slicing planes | 6, 7 | Oppositely inclined layers of strips |
| 8 | Clockwise wound bundle | 9 | Anticlockwise wound bundle |
| 10 to 16 | Consecutive Links on a Strip | 17 | Surface roughening |
| 18 | Equipment | 21 to 26 | Various flow streams on a strip |
| 27 | Liquid flow down the column | 28 | Vapor flow up the column |
| 29 | Streams out of liquid distributor | 30 | Support for bundle |
| 31 | Pipe carrying liquids | 32, 33 | Liquids to be blended |
| 34 | Blended liquid stream | 35, 36 | Randomly packed bed on a support |
| 40 | Rotating shaft | 42 | Vessel having liquid |
| C, D, E | Inflexion points on link surface | h | Height of a link |
| w | Width of a strip | z | Any vertical height (distance) |
| z0 | Height of a link | z1 to z15 | Projection curves at various heights |
| α | Notch cutting angle | β | Recline angle of cut portion |
| φ | Twist angle of link surface | δ | Angle between consecutive links |
| θ | Angle of inclination of strips | | |

DETAILED DESCRIPTION OF THE INVENTION

The unique construction of the contacting device can be described in terms of a preferred embodiment having discrete elements in the form of a strip. The characteristic primary dimension of the strip is its width w. For a given width w, all other dimensions can be derived in terms of ratios related to the width. Width w of the strip can vary anywhere between 2 mm to 200 mm with a preferred range of 3 mm to 100 mm.

Constructing the Basic Element

Figures 1A, 1B:
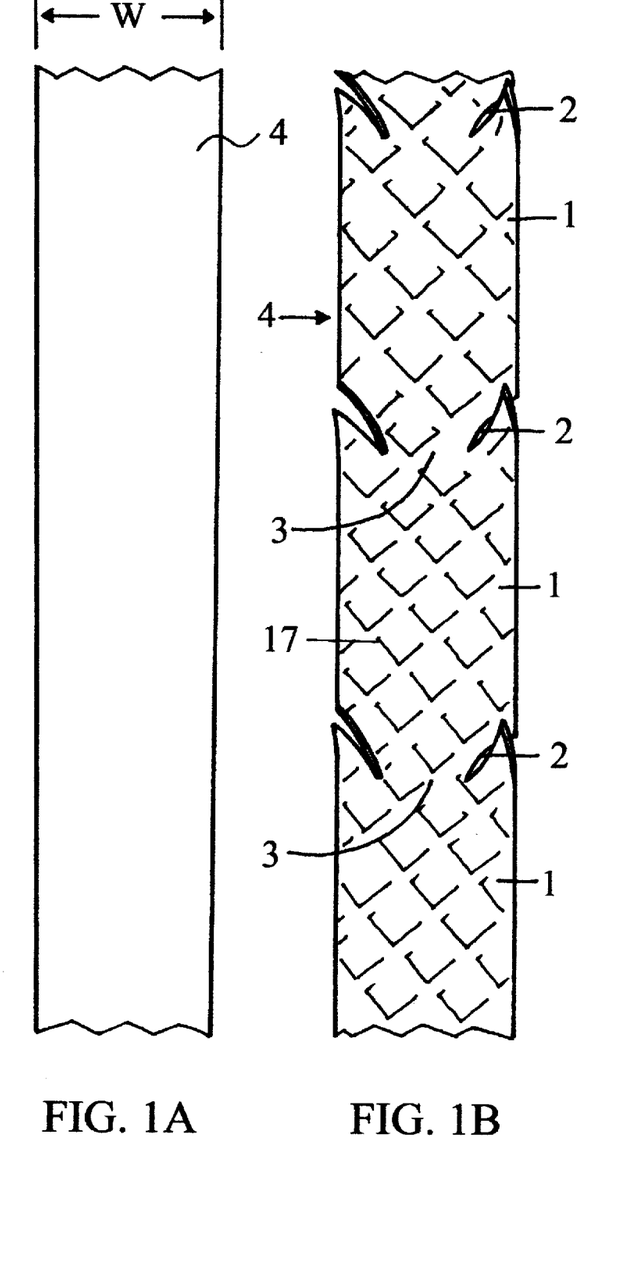
FIGS. 1A to 1C show a strip going through steps of roughening, notching and formation of links between notches.
Figure 1C:
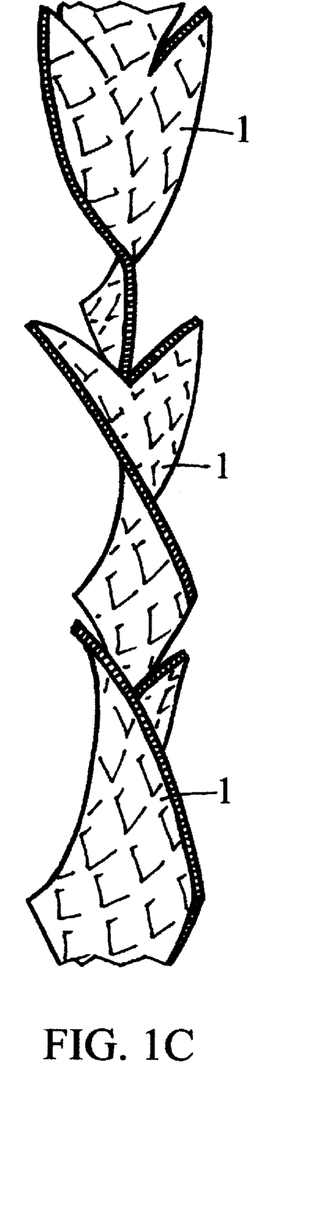

Referring to FIGS. 1A to 1C, the plane strip 4 having a width w (FIG. 1A) is roughened with knurling 17. The strip 4 surfaces can be finely lanced, grooved, fluted, knurled, or roughened to aid the spread of the trickling liquid on the surface of the strip. In the preferred embodiment knurling at 45 degrees is used. As shown FIG. 1B, the roughened strip 4 is then notched in pairs periodically along its length at both edges. The multiple notches 2 are made so that they are in pairs situated on the opposite side of the edge of the strip. The part of the strip remaining between the notches 2 is called base 3. The portion between two consecutive notches, is further shaped, by giving predetermined orientation (twist) forming a link 1. FIG. 1C shows the continuous ensemble of links that are sequentially rotated, giving an overall helical pitch to the strip 4.

Figure 2:
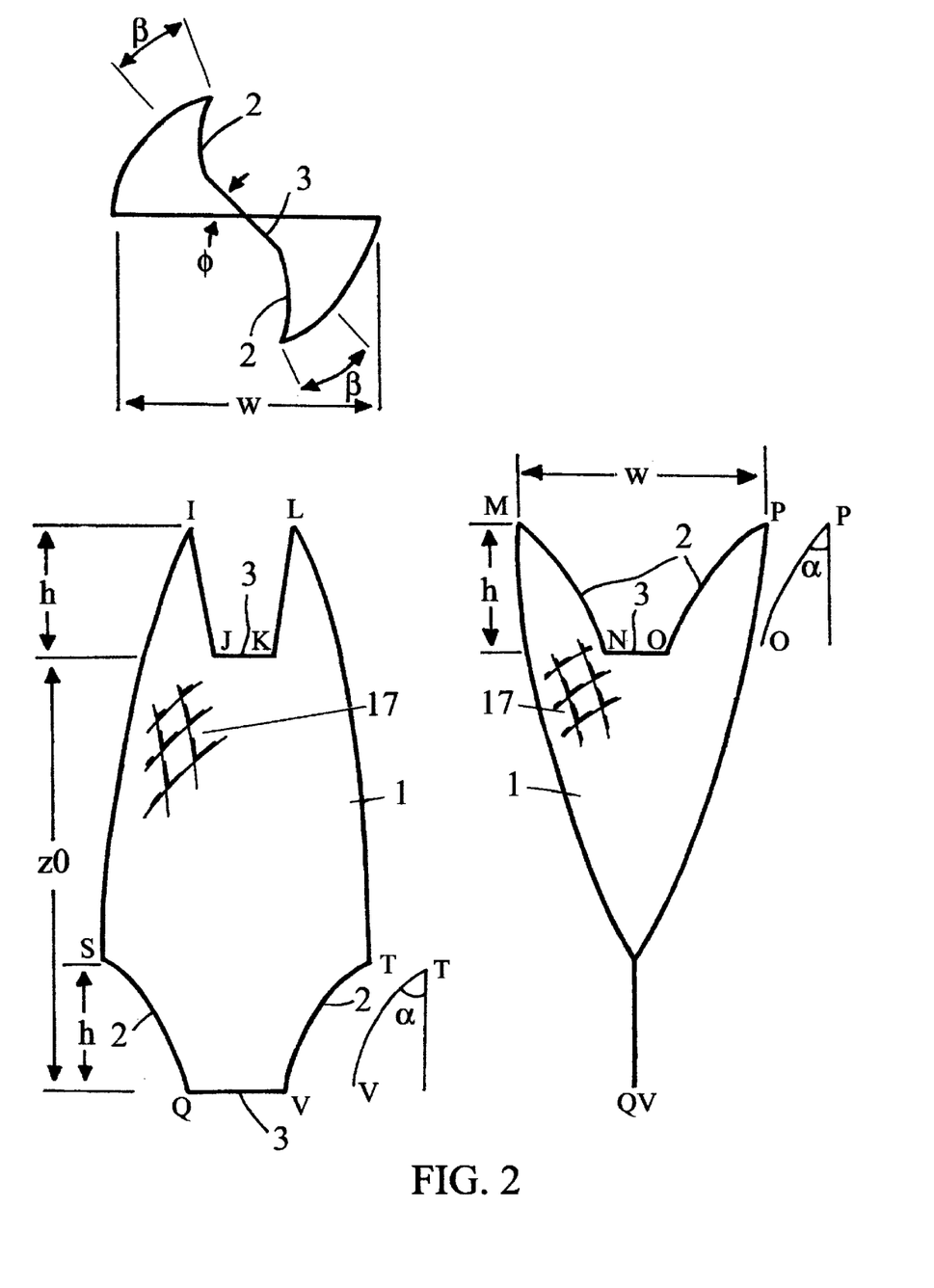
FIG. 2. is three orthogonal views of a typical individual "link" formed between two consecutive notches on a strip.

The orthogonal views of this twisted portion (link 1) between two consecutive notches 2 are shown in FIG. 2. Referring to FIG. 2, the notch cutting angle α to the strip long axis which generates notches 2, can be varied anywhere between 10 to 80 degrees with a preferred range of 10 to 60 degrees.

As shown in the orthogonal views of FIG. 2, the vertical height h of notched portion MN (or SQ) from its tip to the end of the cut (points N or Q) can be varied between 0.1 w to 0.9 w with a preferred range of 0.2 w to 0.6 w.

The unnotched portion of the strip 4 remaining around the strip axis between the two oppositely located pair of notches 2 is designated as base 3 (JK). The base 3 of the notch can have length anywhere between 0.1 w to 0.9 w but preferably in the range of 0.2 w to 0.6 w.

The earlier mentioned pair of two opposite notches 2 at the edge of the strip 4 are made such that cut portions of the pair of notches are reclined in the opposite direction to each other. The angle of recline β of cut portions with respect to base 3 of the notches is equal and opposite and can be varied between 15 to 45 degrees (FIG. 2). The preferred range for the angle of recline β is 15 to 30 degrees. The oppositely reclined cut surfaces on the edge of strip 4 direct the trickling liquid back and forth on the two opposite surfaces of strip 4. The overall height (z0) of link 1 from base 3 of one notch to the base 3 of consecutive notch (JQ or KV as shown in FIG. 2) can be varied anywhere between 1.0 w to 10.0 w but preferred range being 1.5 w to 5 w.

The cut edge of the notches 2 (MN and OP or SQ and VT) can be a straight line or have a slight curvature to facilitate notching.

The strip 4 is notched at fixed intervals with paired notches 2, forming the links 1 between consecutive notches 2. The contoured shape of the surface of link 1 can be imagined by keeping top curve MNOP (or ILJK) substantially fixed and smoothly and elastically twisting bottom notch curve SQVT around the longer axis of strip 4 (FIG. 2). The twist angle φ between the top and bottom base 3 of link 1, could be varied anywhere between 0 and 90 degrees. The preferred embodiment has the angle φ as 90 degrees.

Defining the Shape of Twisted Link Surface

Figure 3:
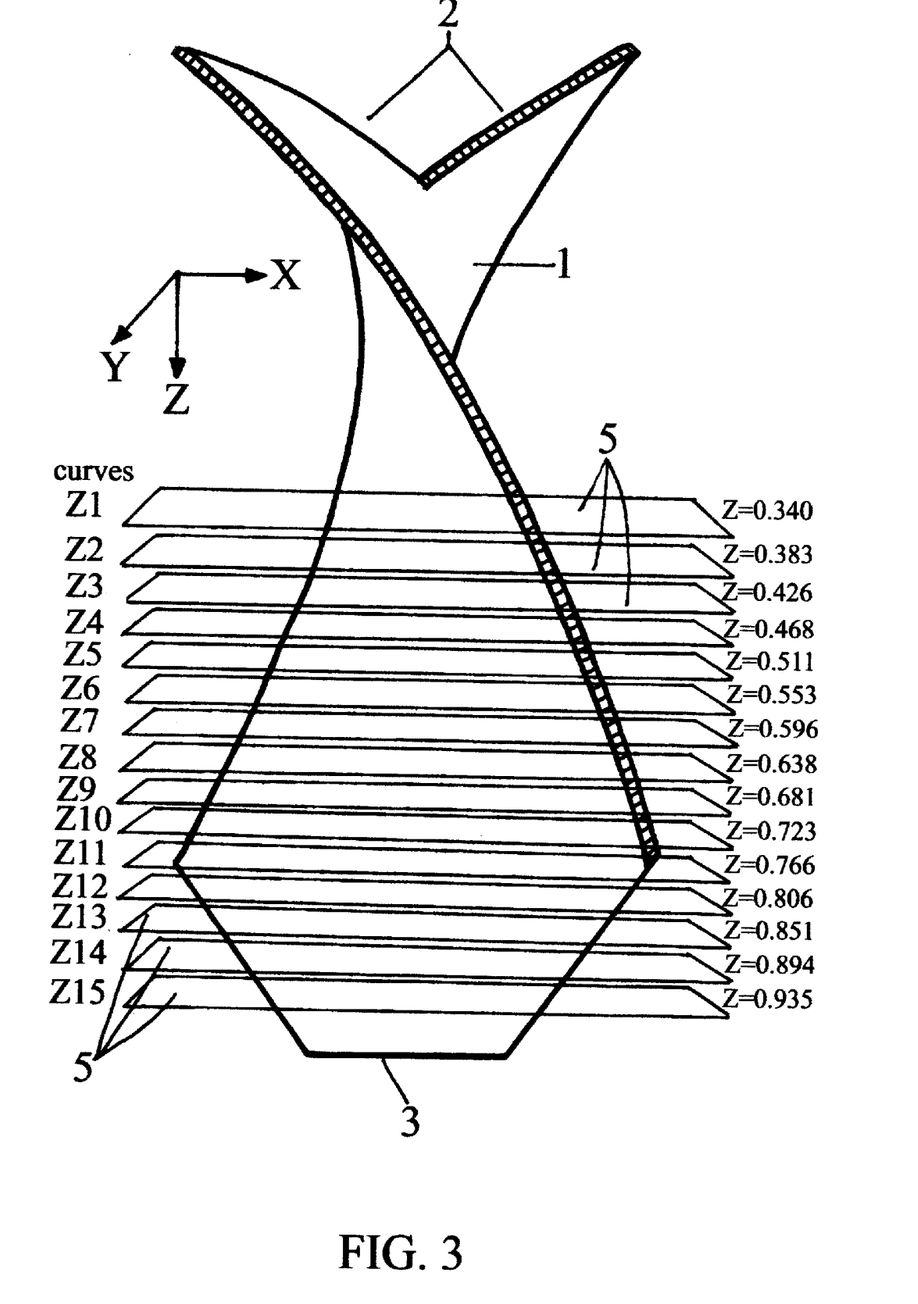
FIG. 3. gives magnified view of contoured surface of the link formed with a twist angle of 90 degrees. The slicing planes at various dimensionless heights are shown.
Figure 4:
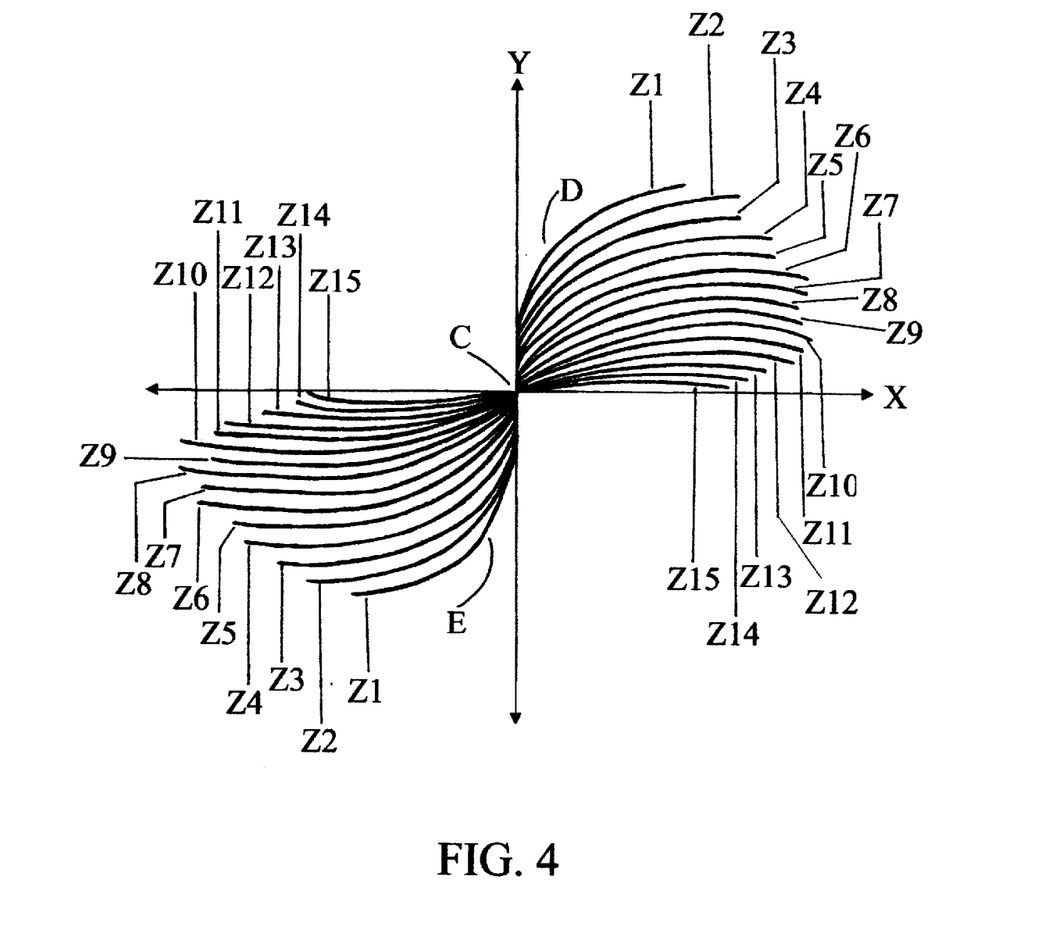
FIG. 4. shows contour curves at various dimensionless heights of the link as projected on XY plane for the link in FIG. 3.

FIG. 3 depicts enlarged view of the three dimensional twisted surface of link 1 having a twist angle of 90 degrees. The shape of the contoured surface of link 1 is particularly defined by taking imaginary horizontal slices 5 at various heights along the long axis of the link. The curves Z1 to Z15 are thus formed in XY plane, by joining the intersection points of slicing plane 5 and the contoured surface of the link. The intersection curves formed by each of the slicing planes are then viewed from top. These "S" shaped curves thus viewed have a very sharp "S" shape in the beginning shown as curve Z1 and gradually flatten to a substantial straight line at the junction of the next link shown as curve Z15 in FIG. 4. The initial sharpness and later a gradual flattening of "S" shape can be manipulated by changing twist angle φ between link bases 3 anywhere between 0 to 90 degrees. As shown in FIG. 4, the curves Z1 to Z15 are plotted in dimensionless form by dividing x and y values (actual coordinates of any point on the curve) by width w and then drawing the curves of Y (=y/w) v/s X (=x/w). The imaginary slices are also taken at various heights represented in dimensionless form by dividing the true height value z by the link height z0. (Z=z/z0). The advantage of dimensionless parameters is that, the curves represent shape of the contoured link surface independent of numerical values of the width w and the link height z0. The curves are drawn starting from dimensionless height Z=0.348 (curve Z1) as the portion of the link above this height is less precisely defined due to simultaneous double contour (twist of link around itself and twist around base 3 between consecutive links).

Figures 5, 6:
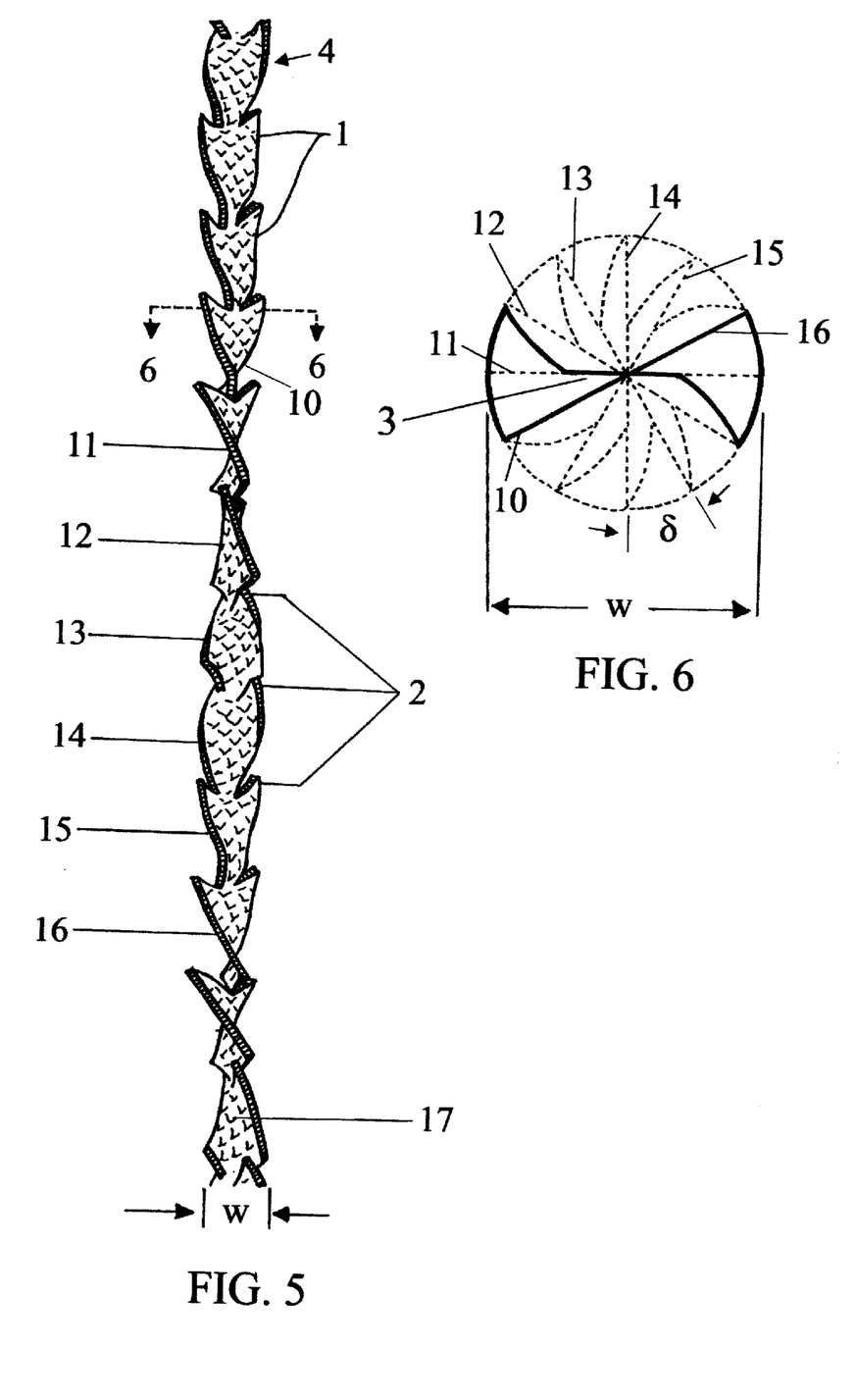
FIG. 5. is a typical diagrammatic view of a continuous strip whose links are angled to each other at 30 degrees thus forming a gentle helical twist along the length of the strip.
FIG. 6. is a fragmentary top sectional view of FIG. 5 taken along line 6—6 which is enlarged for the purpose of clarity. The view shows consecutive links rotated with respect to each other by an angle of 30 degrees.

The initial sharp "S" shape of the top portion curves help in keeping the trickling liquid, which is accelerating through narrow notches 2, within the outer edges of link 1. As the liquid trickles down on its downward path, the gradually flattening "S" curves in the lower portion of the link allows it to spread across the width of the strip, enhancing wetting of most of the strip area The "S" shaped curves Z1 to Z5 viewed in XY plane depicts the three dimensional (spatial) orientation of surface of link 1. The curves Z1 to Z15 generally have three inflexion points (points at which the curve changes its slope abruptly) on its trajectory. The "S" shape of the curves have its middle inflexion point C on the link axis and other two D and E at symmetrically opposite sides (shown for curve Z1 in FIG. 4) of the link. The sharp "S" shape helps to achieve good wetting of the link surface by throwing and spreading the liquid by centrifugal force generated due to the twisted surface of link 1. Further the liquid is simultaneously and substantially contained between the two edges of strip 4 due to holding nature of cupped ends of the "S" shape curves towards the edges. As shown in FIG. 5, the consecutive links are placed with a fixed relative rotation around the long axis of strip 4. The consecutive links are disposed at a twist angle δ at base 3 shared by the links, so that the links are sequentially rotated by the fixed angle δ with respect to each other, forming a helically pitched strip. The angle of twist δ between the consecutive links can be varied anywhere between 10 to 80 degrees to obtain a desired pitch of the overall helix. FIG. 5 shows a preferred embodiment of strip 4 with rotation angle δ of 30 degrees between the consecutive links. Every sixth link, shown in FIG. 5 as 11 and 16, has an identical orientation except that they are rotated through 180 degrees (6×30= 180).

FIG. 6 shows fragmented top view of the relative orientation of consecutive six links 11 to 16 on the strip 4 of FIG. 5. As viewed at the line 6—6, the link 11 is located at twist angle δ of 30 degrees with respect to link 10. The next link 12 is located at further twist angle of 30 degrees with respect to link 11 and the relative link locations continue in the same manner. In FIG. 6, the consecutive links (11 to 15) that are sequentially rotated by 30 degrees (from link 10) are shown by dotted lines. The link 10 and link 16 have the same position as viewed in FIG. 6, and are shown in normal continuous lines. All other links 11 to 15 are shown in dotted lines to indicate their moved position. The sequential rotation between links is done at the junction (base 3) between the links.

The strip 4 can have many numbers of rotating links formed along its length. The number of links on strip 4 can be anywhere between 2 and 50. The preferred embodiment has used 12 numbers of links.

The entire length of strip 4 then has a gentle helical pitch due to a sequentially rotated placement of ensemble of links 1 that are shaped out of a single continuous strip 4. Thus the strip 4 is comprised of plurality of links 1 that are themselves contoured around their long axis, and further arranged in a sequentially rotating manner with respect to each other along the length of the strip.

Flow Pattern on Embodiment

The liquid trickling down the strip 4, flows on the contoured surface of links 1 and finally through the notch area 2, thus substantially alternating back and forth on the two opposite sides of the strip 4. The liquid streams coming from the upper notches meet each other and again separate so that one stream flows through immediate notch to the back of the strip and other continues to the next link.

Figure 7:
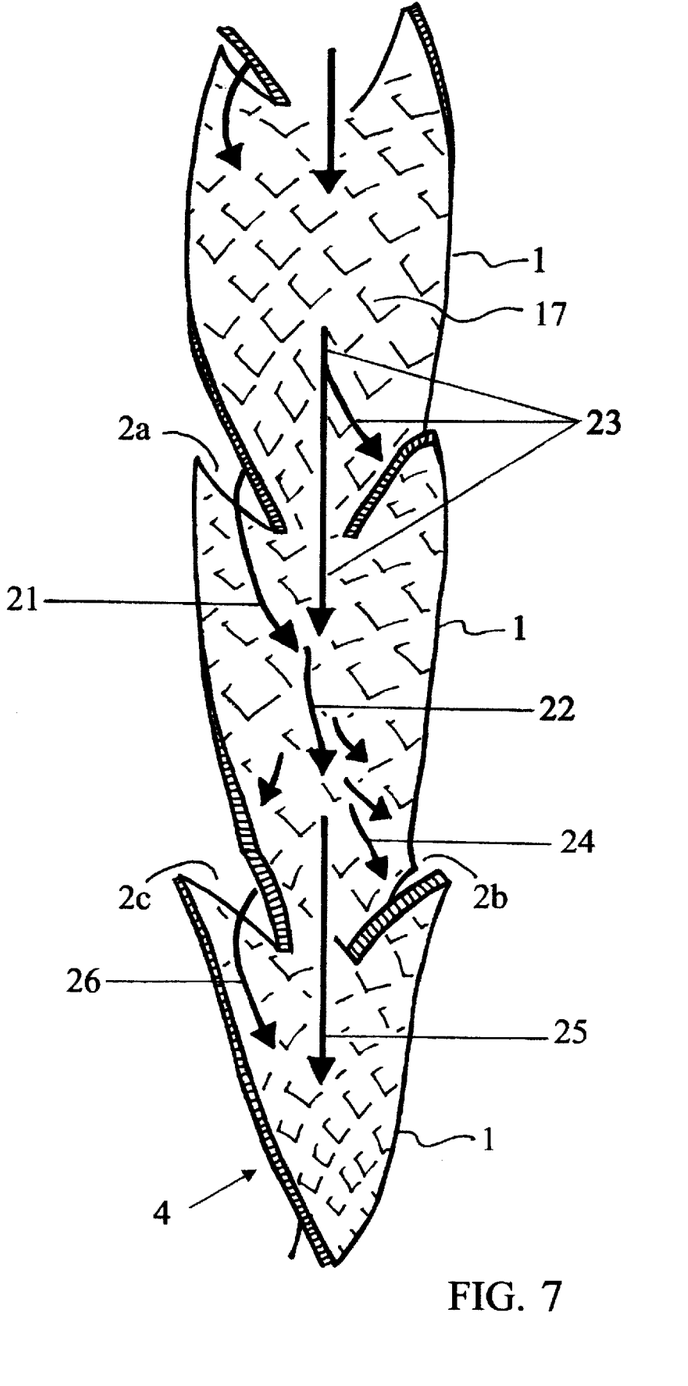
FIG. 7. shows perspective view of representative flow pattern of trickling liquid on an enlarged strip portion consisting of many links.

FIG. 7 explains the above mentioned liquid flow pattern on an enlarged view of the portion of strip 4 showing three links. A trickling liquid stream 21 coming from the back of the strip 4 through notch 2a mixes with a part of stream 23 flowing down on the front surface of the link above. The mixed stream 22 spreads and wets the surface of the link and then again splits into two streams 24 and 25 such that stream 24 goes to the backside surface through notch 2b and stream 25 continues to the front surface of the next link mixing with stream 26 coming from the backside through notch 2c. The link 1 surface is precontoured as well as roughened (preferably knurled) with crisscross patterns 17 so that the liquid streams flowing down also spread across the width w of the links.

Assembling the Bundle

Figure 8:
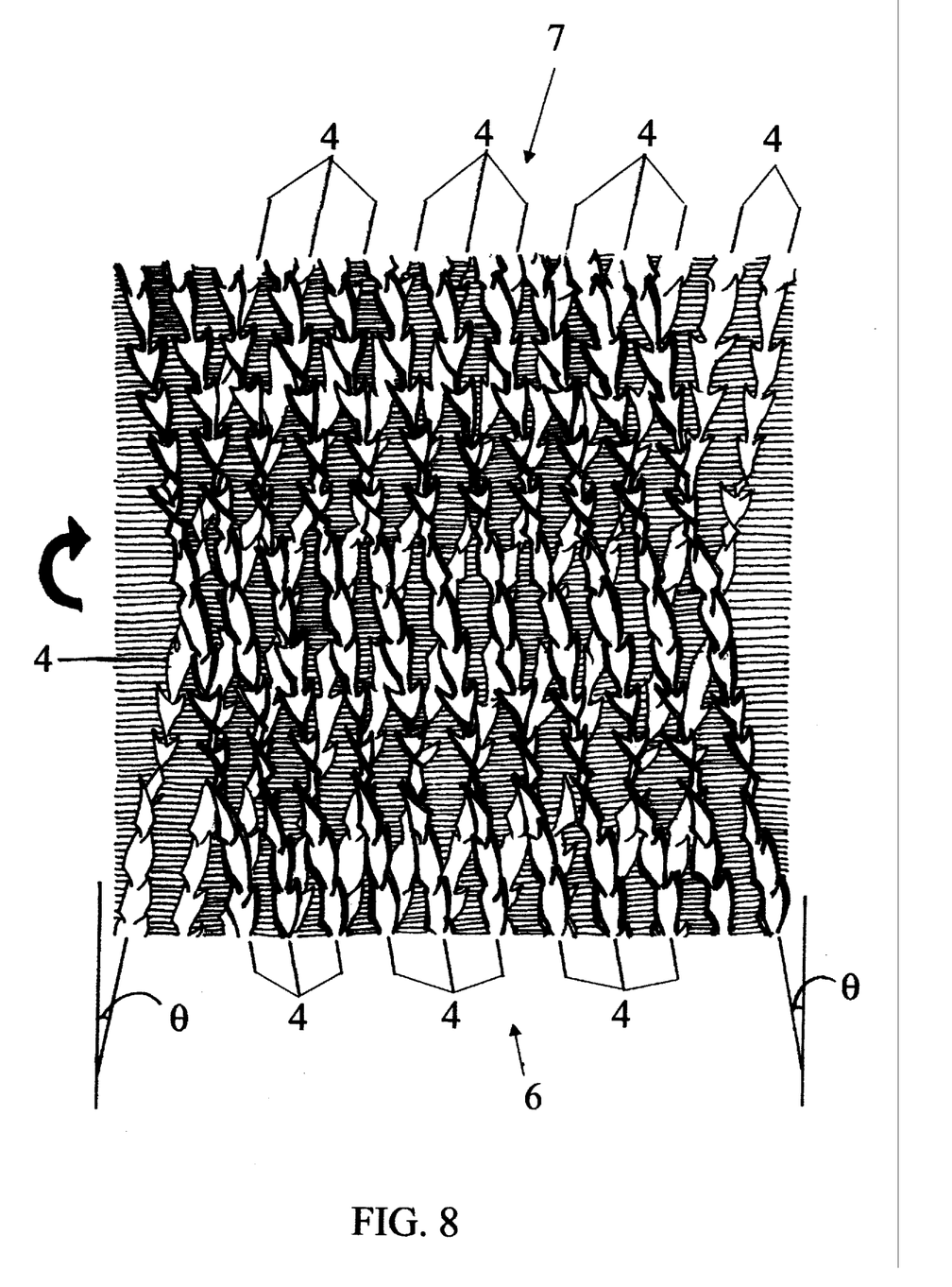
FIG. 8. shows diagrammatic view of layers of strips that are oppositely inclined at an angle θ to the vertical and are put one above the other before rolling into a bundle.

FIG. 8 explains layering arrangement of plurality of strips before making a bundle. The precontoured and preshaped strips 4 are arranged one after the other (touching one another) at an angle θ to the equipment axis such that, the two adjoining layers are inclined at an equal but opposite angle. The angle of inclination θ of the strips in layers 6 and 7 can be varied anywhere between 10 to 80 degrees. The preferred range being 10 to 60 degrees. The two layers 6 and 7 of strips 4 that are oppositely inclined to the equipment axis by angle θ are put one above the other (layer 6 over layer 7) and then rolled like a haystack bundle in the clockwise direction shown by arrows to get desired bundle diameter as required to fit into the given equipment.

Figure 11:
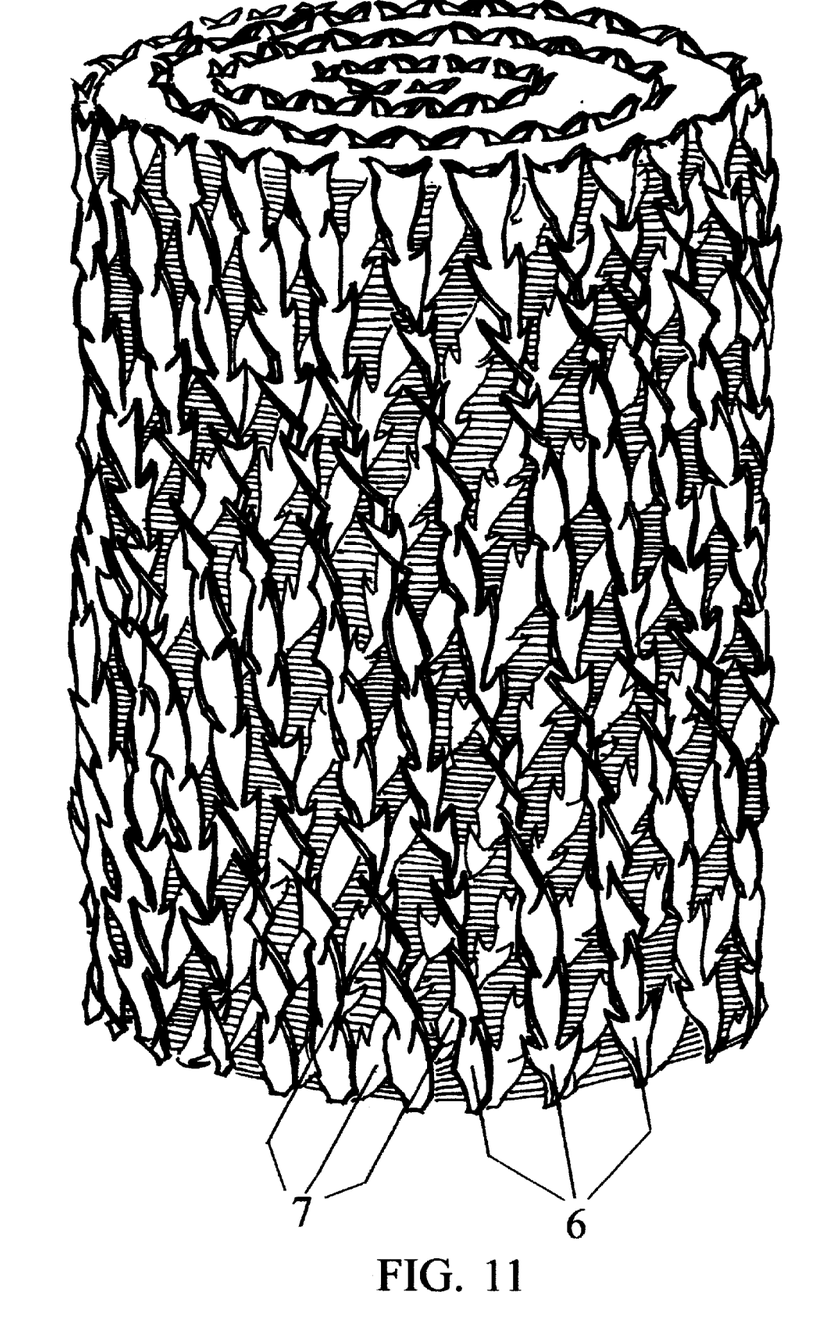
FIG. 11. shows a perspective view of the packing bundle rolled from oppositely inclined strips. The strips are shown away from each other only for clarity of view.

FIG. 11 shows perspective view of the finished spirally wound bundle made from the precontoured and preshaped oppositely inclined strips 4 arranged in the layers 6 and 7. The strips 4 shown in layer 6 and 7 of FIG. 8, and also shown in the spirally wound bundle of FIG. 11, are drawn with gaps between the neighboring strips only to maintain clarity of view.

Figure 9:
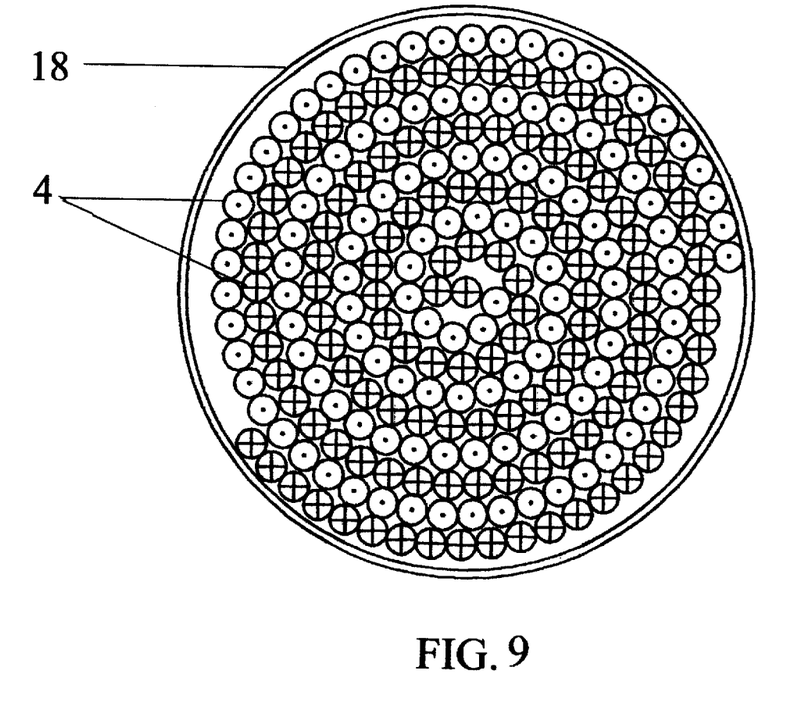
FIG. 9. shows a top view of circular bundle rolled from two oppositely inclined layers of strips. The oppositely inclined strips are represented by circles with "." and "+" inside for clarity of view.

FIG. 9 shows a top view of spirally wound bundle made from strips 4 and placed in equipment 18. The individual strips 4 are shown as small circles to give clarity. The circles with a "dot" inside shows strips inclined in one direction and the circles with "+" show those inclined in the opposite direction.

Additional Embodiments

Figure 10:
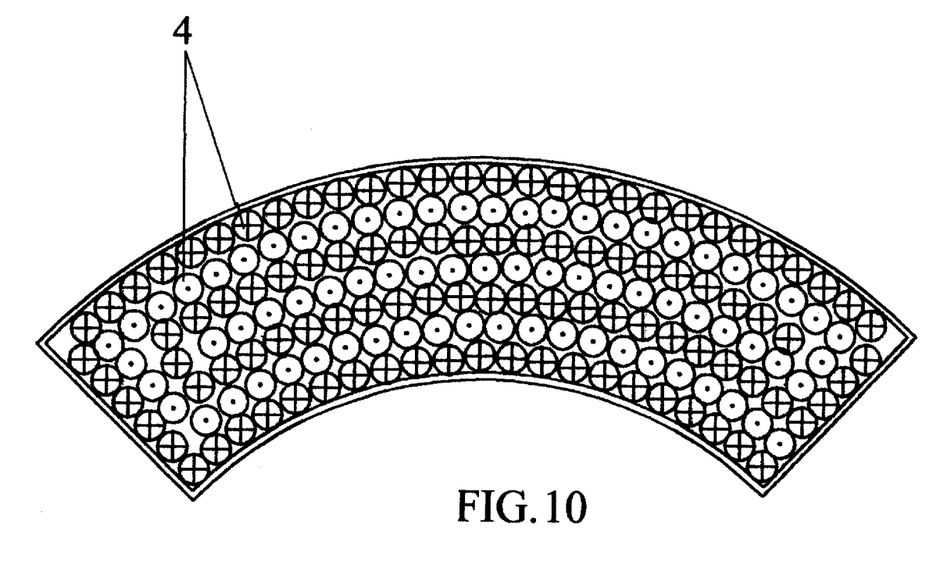
FIG. 10. shows a top view of a bundle rolled from two oppositely inclined layers of strips in a segment of a circle. The oppositely inclined strips are represented by circles with "." And "+" inside for clarity of view.

The oppositely inclined layers 6 and 7 can also be rolled in different shapes to suit the equipment. One such embodiment useful for a large diameter column is shown in FIG. 10, wherein the bundle is wound as a segment of a circle.

The oppositely inclined layers can be wound in a bundle of any required shape to suit the shape of the equipment. The flexibility to wind bundles in the shape congruent to the shape of the equipment is an added advantage.

The bundles of oppositely inclined strips can be wound either in clockwise or anticlockwise directions. Placing alternately wound bundles (clockwise and anticlockwise) one above the other in the equipment further helps in maintaining uniformity of the flow of contacting phases.

Figure 12:
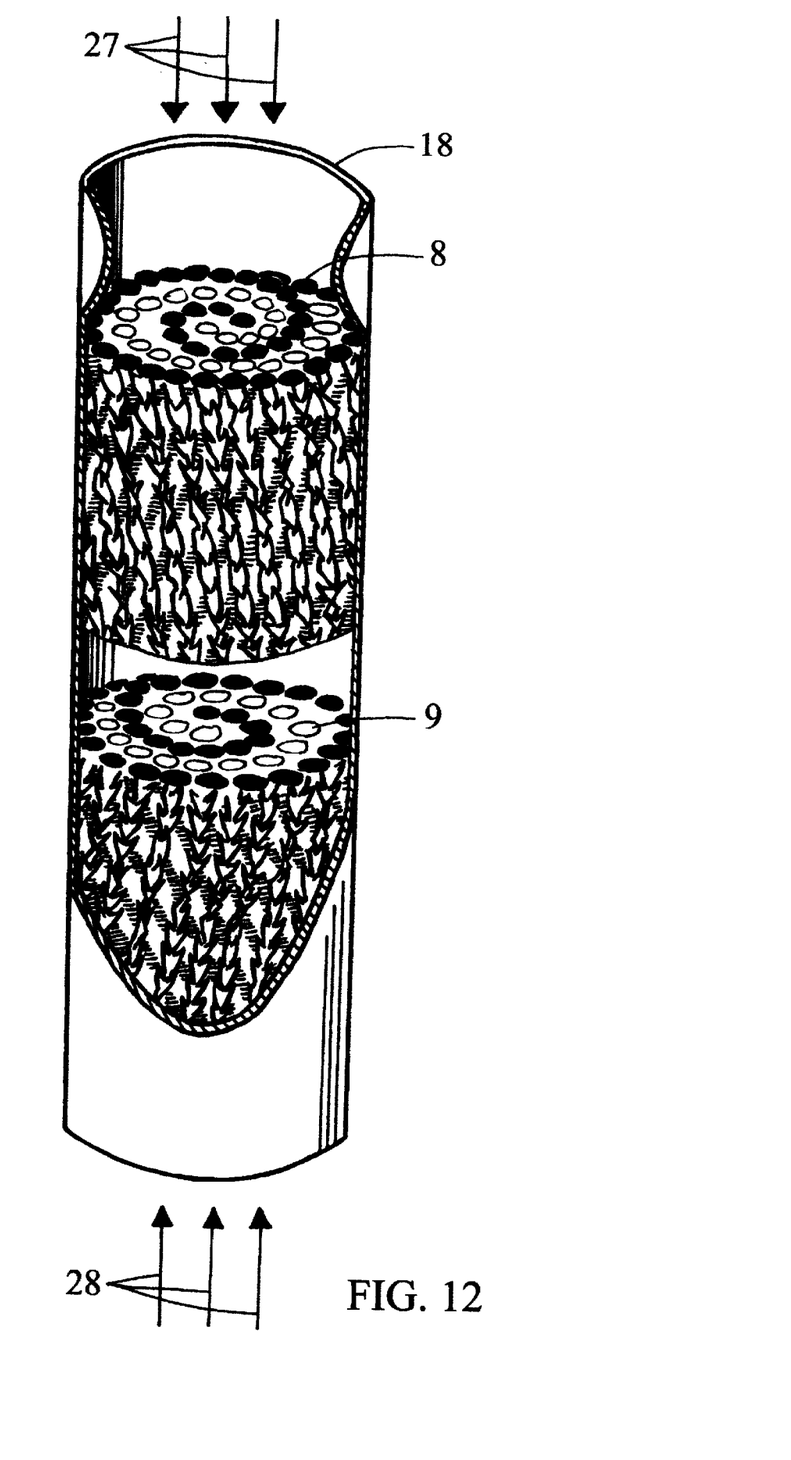
FIG. 12. shows the diagrammatic view of placement of clockwise and anticlockwise wound bundles in a typical column (equipment).

FIG. 12 shows clockwise and anticlockwise wound bundles 8 and 9 used as a structured packing and placed in equipment 18 wherein liquid streams 27 come in intimate contact with rising vapor 28.

Operation

The trickling liquid substantially wets the strip 4 surface, due to its guided back and forth movement through notches 2. The contoured surface of links 1 helps in throwing the liquid between the two edges of strip 4. The liquid also spreads on the link due to roughened surface. The embodiment thus uses substantial area of the strip for spreading a liquid film on it. The embodiment exposes the trickling liquid film alternating back and forth on two surfaces of strip 4, to all the gas streams rising around the strip.

The helical shape of strip 4 (made from links placed in sequential rotation) gives a slight swirling motion to the gas or vapor rising along the strip. The gas gets well mixed without undue pressure drop due to gentle swirl.

The contiguous bundle is made from the inclined strips wound in a spiral configuration. This gives three dimensional symmetry and uniformity to the bundle. Thus the liquid is spread due to combined influence of lateral momentum component generated by the inclination of strips, centrifugal force due to twists, gas drag from the swirling gas rising around the strip and capillary action due to the roughened link surface.

This uniform spatial arrangement distributes liquid evenly into many trickle streams flowing down the matrix of many inclined and interlinked elements. The gas rises through multidirectional twisting spaces created by voids in the matrix of the bundle. Thus both the phases get high interfacial contact area and a uniform concentration and flow profile. The device is particularly useful for many different operations that require high contact area, uniform blending of the phases or uniform spatial disrtribution of the phases.

Advantages of Present Invention

The present invention has many advantages over the corrugated sheet layout and its marginally improved variants disclosed in the prior art. The plurality of individual links on the numerous oppositely inclined strips form a symmetric three dimensional matrix of strips having link surfaces which are touching each other due to spiral winding of oppositely inclined strips. An individual strip in the spirally wound bundle touches two of its neighboring strips in its layer at many points depending on its helical pitch. Further each of the strips in one layer, along with its entire length, is in contact with plurality of strips which are inclined in the opposite direction and which are lying in the immediate inner and outer layer of the spirally wound bundle. The liquid flowing down on any strip, thus not only flows around both surfaces of the links of an individual strip, but also travels from one strip to numerous other strips which are touching each other. This symmetric arrangement helps in quickly distributing excess liquid on one strip to numerous neighboring strips generating an even flow on all the strips. This lateral travel of the liquid across the layers of strips and the continuous mixing and redistribution of liquid on an individual strip generates a uniformly blended liquid film.

Furthermore, as the strips themselves are at an angle to the equipment axis, the liquid also gets radial movement. This enhances flow, temperature and concentration uniformity in a radial plane due to increased radial dispersion of trickling liquid. Such an isotropic flow generates substantially constant concentration profile across any radial plane in the column thereby enhancing mass transfer rates.

The continuously yet smoothly twisting voids within the matrix of strips in the spirally wound bundle, also splits the rising gas or vapor flow into multitudes of streams which keep on mixing and redistributing to generate isotropic flow. Due to the gentle helical twist along the strip, the gas gets a slight swirling motion as it rises, which enhances mass exchange due to mixing. The present invention imparts a gradual change in the direction of vapor from one bundle to another. The arrangement avoids any sudden and abrupt change of direction of the rising vapor that results into wastage of energy in terms of additional pressure drop. The sudden change of the gas direction at every bundle junction due to method of placement of prior art bundle s at 90 degrees rotation, and consequent higher pressure drop, is substantially reduced in this invention.

The symmetric layout of the strips give a very high number of streamlets into which the liquid flow gets uniformly divided inside the packing per unit cross section area of the packing. This gives an excellent "natural distribution" character to the packing. Any maldistribution is very promptly corrected by the basic layout of the packing. Such a high number of trickle streams per m2 of cross section substantially avoids liquid "sheeting" observed in the prior art.

This surprising liquid distribution capability is useful for its use as a liquid distributor for the traditional packing.

The outer strips of the bundle, which are touching the equipment wall, tend to collect the migrated wall liquid .The collected excess liquid is redirected to the neighboring strips, which are lying in the inner layer, which in turn direct the liquid to its inner layer. Thus excess liquid from wall travels towards bulk of the packing. This self-correcting nature of the bundle avoids excessive migration of liquid towards wall of the equipment, referred as "edge effect" in the prior art corrugated sheet packing.

The simple procedure of assembling the packing bundles is a significant advantage over the prior art. The bundle size can be quickly changed and adapted to a new size or shape of the equipment just by winding or removing additional layers of the strips. The flexible morphology of the present invention can generate a range of packing geometries, in a cost effective manner. The spirally wound packing bundles can be suitably fabricated for different applications by varying the strip geometry within the earlier mentioned ratios and ranges of angles. The notch height h, notch cutting angle $\alpha$, link height z0, strip width w, variation in knurling or other surface roughening, angle of inclination $\theta$ of the strips to the equipment axis , number of links per length of the strip, twist angle $\delta$ between the consecutive links and link surface twist angle $\phi$ can be independently manipulated to provide a broad range of packing. Further strips of different geometries can be mixed in a bundle to cater for the need of widely varying conditions in the contact equipment. Such a variety is not feasible in case of the prior art corrugated structured packing due to high cost of manufacture.

Manufacture

The packing strips can be made in various materials of construction like metal, alloys, wire cloths, plastics, glass and ceramics. In case of metallic materials the strips are first cut to desired width and roughened. The strips are then held under tension and partly twisted by mechanical means, notches are cut and further controlled twisting is given to get the desired contour of links. Alternately, traditional fabrication techniques like stamping and die pressing can be used. For nonmetallic materials, the strips are made by traditional methods like injection molding. The winding of spiral bundles can be done by manual or mechanized means.

Versatility of the Device

The present invention is useful as a contacting device for mass and/or heat exchange processes like distillation, rectification, desorption, absorption, stripping, humidification, dehumidification, liquid-liquid extraction.

Further the invention can be useful as a phase contacting device in cooling towers, refrigeration and ventilation systems and gas scrubbers.

The present invention is also suitable for use as a high surface area substrate/catalyst support in biofills, as a static mixer device for inline mixing of gases or liquids and as a contacting media for multiphase reactors such as gas-liquid reactors like trickle towers or packed towers.

Figure 13:
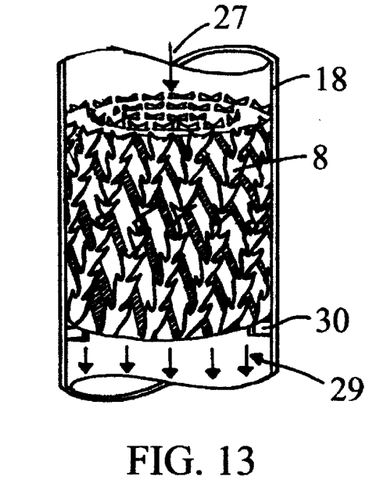
FIG. 13. shows a diagrammatic view of contacting device used as a liquid distributor.

FIG. 13 shows use of the spirally wound bundle as a liquid distributor. The bundle 8 is supported at the edges by support cleats 30 attached to equipment 18. Bulk liquid 27 falls on the top of bundle 8. The liquid moves from over-irrigated central portion to outer layers of strips in the bundle. The liquid gets distributed uniformly on all the strips as it travels downwards. Finally a substantially well distributed plurality of streamlets 29 trickle down from the bottom ends of the strips in the bundle 8 over traditional packing (not shown) in the equipment 18.

The uniform fluid distribution characteristic of the present invention can be put to use as a static (in-line) mixer. Any two fluids (both either gas or liquid) can be mixed on the spirally wound bundle of preshaped strips. For two different liquids trickling down on the spirally wound bundle, the blending is affected due to repeated splitting and recombining of liquid streams on individual strips along with transverse travel of liquid streams from one layer of strips to the adjoining layer of strips. For mixing of gases, the twisting spaces formed in the matrix of the bundle, split and recombine streams of gases several times, thus blending them to form a uniform mixture.

Figure 14:
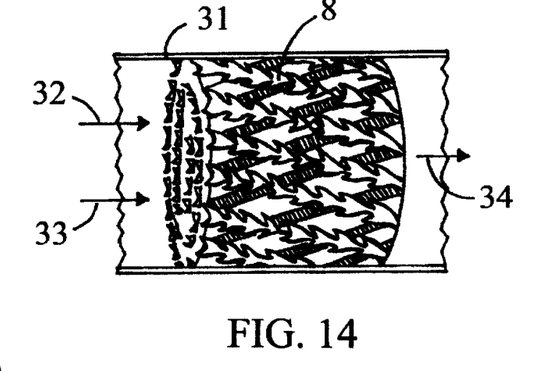
FIG. 14 shows a spirally wound bundle in the pipe wherein two liquids are blended into a mixed stream. The view shows use of the device as a static mixer.

In yet another embodiment, the spirally wound bundle is put in the path of two liquids to be blended. The liquids in this embodiment occupy the whole volume of container (Full-bore flow) as against the earlier mentioned embodiment, in which the liquid trickled down the bundle. FIG. 14 shows such an embodiment. A spirally wound bundle 8 is closely fitted in a pipe 31. Two liquid streams 32 and 33 enter the bundle 8. As they flow on the bundle, they get repeatedly split and recombined on the matrix of strips and twisting voids. The liquids get blended into each other and come out as a mixed stream 34.

Another inventive utilization of the spirally wound bundle is for making random packing. Small bundles of 12 mm to 100 mm nominal diameter are spirally wound using oppositely inclined strips of relatively smaller width to constitute random packing elements. The smaller width of strip w can be preferably chose n anywhere between 0.05 to 0.3 times the nominal diameter of the small bundles. The small bundles dumped in a mass or heat exchange column, as random packing, provide surface area for mass transfer between the downward flowing liquid and the gas envelopes of irregular shape which are rising up through the randomly packed bed. The downward flowing liquid due to lateral and axial movement on strips wets all the random packing surface, thus providing large contact area for mass transfer with the gas or vapor rising through the twisted spaces within the packing and between the dumped packing.

Figure 15:
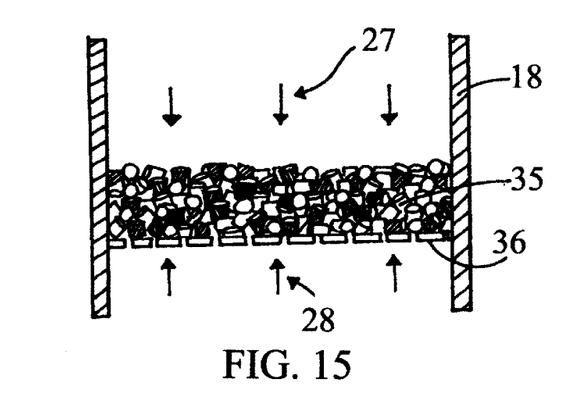
FIG. 15 shows use of small bundles as a randomly packed bed.

FIG. 15 shows such an embodiment in which small bundles are dumped on a grid support 36 forming a randomly packed bed 35 in the equipment 18. The liquid 27 travels on the surfaces of randomly packed bundles wetting them. The vapor 28 travels up in bubbles or envelopes through the liquid irrigated packing. The large wetted area of the random bundles provides the interface for mass transfer.

Yet another use of present invention is as an agitating device for mixing fluids in a vessel. The spirally wound bundles made from oppositely inclined strips as described in the present invention, are attached to a rotating shaft instead of traditional agitator blades. The bundles are attached at the tip of the rotating shaft and are oriented either vertically (bundle axis inline with the shaft axis) or horizontally (bundle axis perpendicular to the shaft axis) or at any intermediate inclination with respect to the shaft. The bundle of present invention, attached at the end of a rotating shaft and thus moving in a body of fluid in a vessel, makes the fluid flow along the oppositely inclined strips in two principle directions, one along the axis of the bundle and other in the radial direction. The rotating matrix of oppositely inclined strips of a spirally wound bundle, imparts momentum to the liquid in axial and radial directions. Further, with splitting and recombining of bulk liquid streams inside the matrix of the moving bundle result into blending and agitation of the liquid body in the vessel. Preferred embodiment with a long and slender bundle (bundle length to diameter ratio greater than 2) gives good results.

Figure 16A:
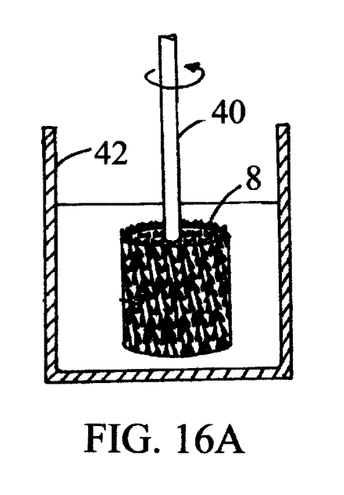
FIGS. 16A to 16C show different orientations of bundles when used as an agitator for a liquid in a vessel.
Figure 16B:
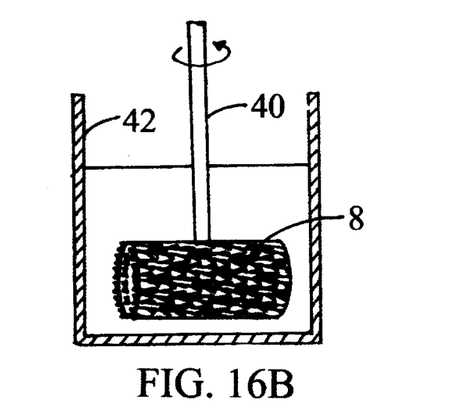
Figure 16C:
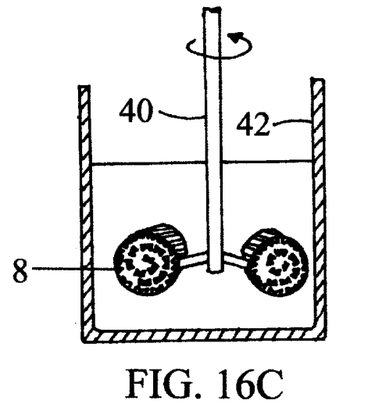

FIG. 16A shows bundle 8 attached to a shaft 40 such that bundle axis and the shaft axis is aligned. The shaft is rotated by a drive (not shown) that agitates the liquid in vessel 42. The rotating bundle splits and gives motion to the bulk liquid passing through the matrix of strip surfaces and voids in the bundle. The moving strips in the bundle redirect the liquid streams in many directions, simultaneously splitting and recombining them. Apart from mixing, the liquid gets momentum in two principle directions, one along the axis and other in the radial direction. This draws fresh liquid into the bundle, thus establishing a bulk flow pattern in vessel 42. FIG. 16B shows another embodiment in which the bundle 8 axis is perpendicular to the axis of shaft 40. FIG. 16C depicts yet another embodiment in which bundles 8 are attached at a distance from the shaft 40. The bundle axis is in perpendicular plane to the plane of the shaft axis.

Conclusions and Ramifications

Accordingly, the phase contact device of this invention solves most of the problems encountered in prior art without creating new ones. It encompasses variety of useful applications where high contact area, uniform blending of phases or uniform spatial distribution of phases is the requirement. Furthermore the contacting device has additional advantages like It is simple to manufacture with conventional machines and methods.

It can be made from any materials of construction normally used in industry.

It is versatile and flexible.

In addition to few embodiments enumerated earlier, many more such as mist eliminator, fins cluster for heat exchanger tubes, gas distributor, fuel-air mixer etc. can be built.

It is a macro assembly of micro elements. The micro level elements can be selected and shaped and tuned to suit individual physical properties of the phases.

Thus the scope of the invention is not limited by few embodiments illustrated as above. The scope of invention should be viewed beyond the examples given.

I claim:

1. A device for enhancing contact between a first fluid having a predominant direction of flow and a second fluid, comprising:

(a) a plurality of discrete single continuous strip elements having a characteristic primary dimension in the direction of the small axis of said strip element, (b) edges of said strip elements notched and the element surface between said notches creating a link contoured along said surface length forming a continuous ensemble of said links positioned in a sequentially rotating manner along the entire length of the strip element and producing a helical pitch along said entire length, (c) other pluralities of said strip elements interposed in adjacent layers in an alternating oppositely inclined manner forming a bundle and providing a matrix of surfaces having multitudes of contact points, whereby said first fluid flows and spreads on said contoured surface and splits through said notches substantially wetting the surface of said element and simultaneously intermixes with the first fluid streams on the adjoining strip elements, whereby said first fluid achieves intimate contact with said second fluid travelling in channels provided by voids in said matrix of the element surfaces.

2. The element of claim-1 wherein remainder dimensions are proportioned in ratio to said primary dimension whereby spatial uniformity is provided in the said matrix of the element surfaces.

3. The link as described in claim-1 wherein said contoured surface between the notches is shaped by substantially fixing the top notch portion of said link and smoothly yet elastically twisting bottom notch portion of the same link around the larger axis of the link by an angle and the said angle ranges anywhere up to 90 degrees.

4. The contoured surface as described in claim-1 wherein said contoured surface is roughened.

5. The link in claim-1 wherein the height of said link between the consecutive notches ranges between 1.5 to 10 times said primary dimension of said element.

6. The link described in claim-1 has equal top and bottom notch height ranging between 0.1 to 0.9 times said primary dimension.

7. The link described in claim-1 has the same connecting base with the adjacent links and the dimension of said base ranges between 0.1 to 0.9 times said primary dimension.

8. The element according to claim-1 wherein said notches are cut on edges of the element at an angle to long axis of the element and said angle ranges between 10 to 80 degrees.

9. The links as described in claim-1 are positioned on said element sequentially at an angle to each other and said angle ranges between 10 to 80 degrees.

10. The element as described in claim-1 is notched providing continuous ensemble of plurality of links along the long axis of said element and said links number between 2 to 50 in said element.

* * * * *